US006925489B1

(12) United States Patent
Curtin

(10) Patent No.: US 6,925,489 B1
(45) Date of Patent: Aug. 2, 2005

(54) METHODS AND APPARATUS FOR IDENTIFICATION AND PURCHASE OF BROADCAST DIGITAL MUSIC AND OTHER TYPES OF INFORMATION

(75) Inventor: Steven DeArmond Curtin, Freehold, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/444,818

(22) Filed: Nov. 22, 1999

(51) Int. Cl.[7] .............................................. G06F 15/16

(52) U.S. Cl. ....................... 709/217; 709/217; 709/219; 711/1; 375/219; 395/200; 455/66; 84/609; 380/25

(58) Field of Search ................................ 709/219, 217; 395/200; 455/66; 84/609; 380/25

(56) References Cited

U.S. PATENT DOCUMENTS

| | | | | |
|---|---|---|---|---|
| 4,843,562 A | | 6/1989 | Kenyon et al. | |
| 5,577,266 A | * | 11/1996 | Takahisa et al. | 455/66 |
| 5,616,876 A | * | 4/1997 | Cluts | 84/609 |
| 5,809,246 A | * | 9/1998 | Goldman | 395/200 |
| 5,812,937 A | * | 9/1998 | Takahisa et al. | 455/66 |
| 5,835,595 A | * | 11/1998 | Fraser et al. | 380/25 |
| 6,295,555 B1 | * | 9/2001 | Goldman | 709/219 |
| 6,317,784 B1 | * | 11/2001 | Mackintosh et al. | 709/219 |

FOREIGN PATENT DOCUMENTS

| | | |
|---|---|---|
| DE | 43 13 107 C1 | 4/1993 |
| EP | 0 713 335 A2 | 5/1996 |
| EP | 00 31 0070 | 11/2004 |
| WO | WO 99/35771 | 7/1999 |

OTHER PUBLICATIONS

P. Kafka, "Play it Again," http://www.forbes.com, Jul. 1999.

J.R. Garber, "Albums and Alpo," http://www.forbes.com, Jul. 1999.

D. Sinha, J.D. Johnston, S. Dorward and S.R. Quackenbush, "The Perceptual Audio Coder," in Digital Audio, Section 42, pp. 42–1 to 42–18, CRC Press, 1998.

B.W. Kroeger and A.J. Vigil, "Improved IBOC DAB Technology for AM and FM Broadcasting," SBE Engineering Conference, pp. 1–10, 1996.

B.W. Kroeger and D. Cammarata, "Robust Modem and Coding Techniques for FM Hybrid IBOC DAB," IEEE Transactions on Broadcasting, vol. 43, No. 4, pp. 412–420, Dec. 1997.

B.W. Kroeger and P.J. Peyla, "Compatibility of FM Hybrid In–Band On–Channel (IBOC) System for Digital Audio Broadcast," IEEE Transactions on Broadcasting, vol. 43, No. 4, pp. 421–430, Dec. 1997.

* cited by examiner

*Primary Examiner*—William A. Cuchlinski, Jr.
*Assistant Examiner*—Adnan Mirza

(57) ABSTRACT

Identification information is extracted from a current broadcast of a piece or music or other type of information of interest to a user, and stored in a memory or other storage device, in response to a user command. The identification information includes sufficient information to identify at least one deliverable information item associated with the current broadcast, e.g., a CD or MP3 file which contains the particular piece of music. When the user later has access to a wired or wireless network connection, the extracted identification information is delivered over a network connection to a server which processes the delivered information to identify the deliverable information item associated with the broadcast. The user can then purchase the deliverable information item by appropriate interaction with the server. The extracted identification information may be stored in a removable memory device associated with a receiver which receives the broadcast. In this case, the removable memory device is subsequently removed from the receiver and inserted into another device which establishes the network connection for delivery of the identification information to the server.

23 Claims, 3 Drawing Sheets

METHODS AND APPARATUS FOR IDENTIFICATION AND PURCHASE OF BROADCAST DIGITAL MUSIC AND OTHER TYPES OF INFORMATION

FIELD OF THE INVENTION

The present invention relates generally to systems for purchase and delivery of music or other information, and more particularly to techniques for allowing users to identify and purchase music or other information associated with a particular broadcast from a radio station, digital audio broadcasting (DAB) system or other type of communication system.

BACKGROUND OF THE INVENTION

Existing electronic commerce applications allow users to make purchases of various types of information-related products over computer networks such as the Internet. For example, a user can typically purchase digital music, e.g., "singles," compilations such as compact disks (CDs), etc. over the Internet by accessing a corresponding web site, providing the necessary payment information, e.g., a valid credit card number, and downloading the music from the site. A well-known conventional format for downloadable audio information of this type is the MPEG-1 Level 3 Digital Audio Standard, also referred to as MP3. In such applications, the music may be transmitted to the user in an at least partially-encrypted format, so as to prevent unauthorized distribution and use. An authorized user is then subsequently provided with a decryption "key" which allows the music to be decrypted and used. Similar techniques may be used to purchase and download other types of audio information over the Internet, e.g., live broadcasts, interviews, talking books, etc.

A number of other techniques have been developed which allow users to purchase music that corresponds to a particular song currently or previously played on a radio station. For example, a system known as StarCD, from ConneXus Corporation, simultaneously monitors multiple radio broadcasts and uses pattern recognition software to identify the particular songs that are being played by each of the stations. A user hearing a particular song of interest in a radio broadcast can subsequently enter a command "*CD" on the keypad of a mobile telephone of a participating mobile carrier. The user is then prompted by the system for the frequency of the station and the time at which the song of interest was broadcast. The StarCD system then determines a CD which contains the song, identifies it to the caller via a voice prompt, and allows the user to purchase the CD over the telephone.

Another such technique, developed by Get Media of San Jose, Calif., provides Internet software which includes a Java applet that delivers playlist data to users via a radio station web site. The software allows users to obtain from the web site information about a song they are hearing broadcast by a given radio station, such as title, corresponding CD, performer information, etc., and to purchase the CD. This technique may also be implemented using a designated toll-free telephone number, such that if a user is not near a computer when hearing the song, the same information and ordering feature can be obtained by calling the designated number.

It is also known to provide music purchase kiosks in public places such as restaurants, coffee shops, etc. from which a user can purchase music for download directly to a portable MP3 player carried by the user. However, such an approach assumes a bidirectional link to a music server, which generally does not exist in a conventional radio broadcast system.

Digital audio broadcasting (DAB) systems are capable of delivering music in a format suitable for recording in a receiver memory, such that the music can be replayed on user demand. For example, proposed systems for providing DAB in the analog FM radio band are expected to provide delivery of near CD-quality audio. A problem associated with the recording of music delivered via a DAB system is that there is no mechanism for detecting that the music has been recorded by a user, and therefore the artist, distributer, record company, etc. may not be properly compensated. Another problem is that even if a user is able to record and play back the music delivered via the DAB system, by the time the user realizes that a particular song or other piece of music is of particular interest, part of the music has already been streamed to the user and is therefore unavailable for storage.

In view of the foregoing, it is apparent that a need exists for improved techniques for permitting users to purchase digital music or other information corresponding to a broadcast of a DAB system or other type of communication system.

SUMMARY OF THE INVENTION

The present invention provides improved methods and apparatus for allowing users to purchase music or other deliverable information items corresponding to a particular broadcast by an analog radio station, digital audio broadcasting (DAB) system or other type of communication system.

In accordance with the invention, identification information is extracted from a current broadcast of a piece of music or other type of information of interest to a user, and stored in a memory or other storage device, in response to a user command. The identification information includes sufficient information to identify at least one deliverable information item associated with the current broadcast, e.g., a CD or MP3 file which contains the particular piece of music. Examples of such identification information in the case of a piece of music include artist, title, album name, label, source, date and time associated with the current broadcast of the piece of music. The identification information may be extracted from a compressed digital audio bitstream associated with the current broadcast.

When the user later has access to a wired or wireless network connection, the extracted identification information is delivered over the Internet or other network connection to a server which processes the delivered information to identify the deliverable information item associated with the broadcast. The user can then purchase the deliverable information item by appropriate interaction with the server.

In accordance with another aspect of the invention, the extracted identification information may be stored in a removable memory device associated with a receiver which receives the broadcast. In this case, the removable memory device is subsequently removed from the receiver and inserted into another device which establishes the network connection for delivery of the identification information to the server.

Advantageously, a system configured in accordance with the invention allows a user to identify and purchase music that is heard in a broadcast, while also ensuring that artists, distributers, record companies, etc. are appropriately compensated. The invention can be applied to other types of digital information, including, e.g., data, video and image information. In addition, the invention may be implemented in numerous applications other than DAB systems, such as Internet and satellite broadcasting systems, systems for simultaneous delivery of audio and data, etc.

DETAILED DESCRIPTION OF THE INVENTION

Figure 1:
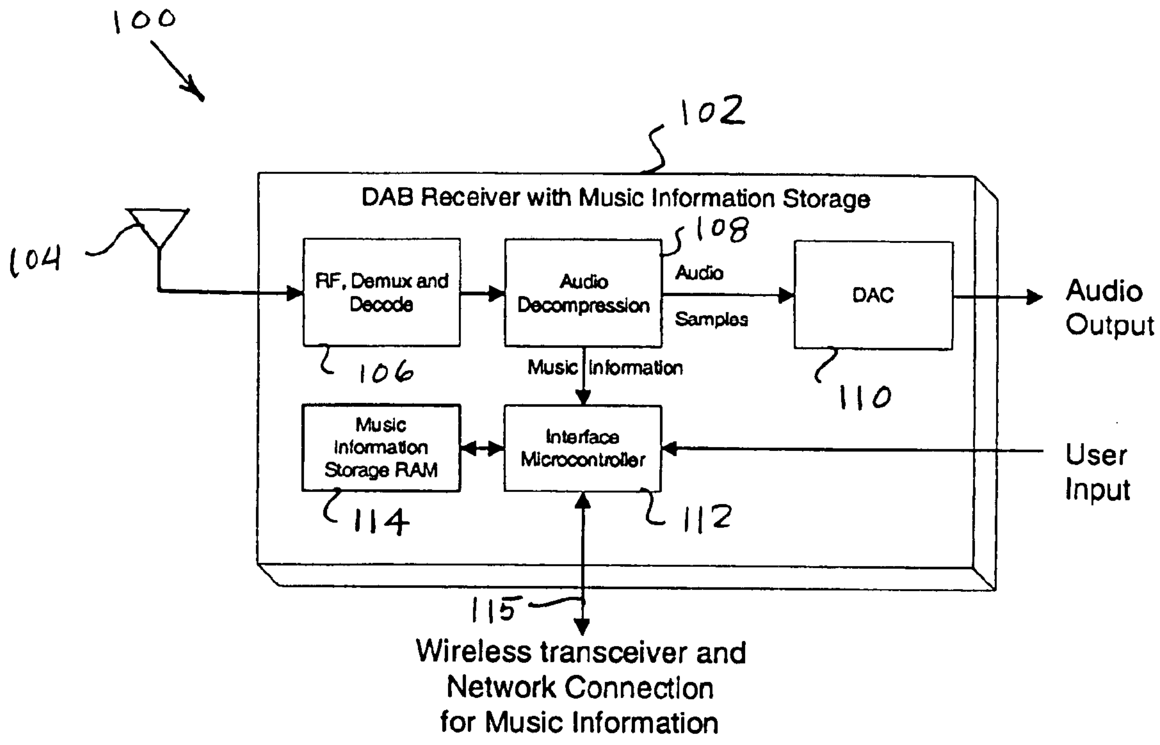
FIG. 1 is a block diagram of an exemplary digital audio broadcasting (DAB) receiver with music information storage capability in accordance with a first illustrative embodiment of the invention.

FIG. 1 shows a block diagram of a receiver portion of a communication system 100 in which the present invention may be implemented. The receiver portion of the system 100 includes a digital audio broadcast (DAB) receiver 102 and a receiving antenna 104. A DAB signal broadcast by a corresponding transmitter, which is not shown, is received by the antenna 104 and applied to a radio frequency (RF) demultiplex and decode element 106. The DAB signal may be, e.g., a hybrid in-band on-channel (HIBOC) FM signal having an analog FM host and one or more digital sidebands. In this case, the analog FM host corresponds to a conventional analog FM signal, and digital audio information is transmitted in the sidebands.

For purposes of this illustrative embodiment, it will be assumed without limitation that digital music information is transmitted in one or more digital sidebands of the incoming DAB signal. It is also assumed that the digital audio information is transmitted in a compressed format, e.g., encoded using perceptual audio coder (PAC) encoding techniques such as those described in D. Sinha, J. D. Johnston, S. Dorward and S. R. Quackenbush, "The Perceptual Audio Coder," in Digital Audio, Section 42, pp. 42-1 to 42-18, CRC Press, 1998, which is incorporated by reference herein. The digital audio information may correspond to, e.g., a particular song or other piece of music broadcast by the system.

The RF demultiplex and decode element 106 separates the digital sidebands from the host carrier, performs appropriate channel decoding operations, and delivers a corresponding compressed digital audio bitstream to an audio decompression element 108. The audio decompression element 108 decompresses the encoded digital audio bitstream to generate a corresponding stream of digital audio samples that are supplied to a digital-to-analog converter (DAC) 110. The DAC 110 converts the digital audio samples to an analog format to generate a reconstructed audio output signal. The audio output signal is supplied to a speaker or other similar element which generates a corresponding audibly-perceptible output for a user.

The audio decompression element 108 also extracts from the encoded digital bitstream music information that uniquely identifies a particular piece of music or other audio information by artist, title, album, label, source, date, time, etc. Such information may be incorporated in the encoded audio bitstream using conventional techniques.

The extracted music information is supplied from the audio decompression element 108 to an interface microcontroller 112. The interface microcontroller 112 in response to a particular user input directs the storage of the extracted music information in a random access memory (RAM) 114 in the DAB receiver 102. For example, when a user hears a particular song or other piece of music of interest being output by a speaker associated with the receiver 102, the user can push a button or otherwise enter a command or other instruction to direct the interface microcontroller 112 to store extracted music information for the current audio output in the RAM 114. As another example, the user can enter a command or other user input that specifies that the receiver 102 enter a mode in which it automatically stores extracted music information for each of the pieces of music that are broadcast while the receiver remains in that mode.

At a later point in time, e.g., when the user is able to establish a network connection 115 via a wireless transceiver that may be implemented at least in part in the interface microcontroller 112, the extracted music information is transmitted over the network connection 115 to a music server which is capable of delivering the corresponding music. Advantageously, this music server may be a music server that is not otherwise associated with the DAB system 100. In other embodiments, the network connection 115 may be established over a wired network.

For example, the DAB receiver 102 may be installed in an automobile, such that the user does not have direct access to a desired music server when the broadcast is heard, e.g., the car may be in motion such that the user is unable to take the actions needed to establish a connection via a mobile telephone or other device, or the automobile may be out of range of a particular wireless network connection. In addition, as previously noted, a portion of the broadcast music will generally have already been streamed to the receiver at the time the user notes that the broadcast is of particular interest, such that initiating storage or other download directly from system 100 may not be sufficient to provide the entire piece of music.

The invention thus allows a user to provide a simple input, e.g., a push of a single button, to indicate that a particular broadcasted piece of music is of interest, and the receiver 102 automatically extracts from the broadcast information that the user will need to download or otherwise purchase the piece of music from a different source. This ensures that the user need not rush to establish a network connection while the broadcast is in progress, and also completely eliminates the need for the user to write down or otherwise remember easily-forgotten information such as the radio station or time of the broadcast.

It should be noted that the extracted music information may be stored in a memory device other than RAM 114. For example, the receiver 102 may be configured to include a slot adapted to receive a Personal Computer Memory Card International Association (PCMCIA) card or other type of memory card, such that the interface microcontroller 112 directs the storage of the extracted music information directly into the card. In such an embodiment, a user simply removes the card at some time after entry of the above-noted user input command, and subsequently inserts the card into a corresponding slot in a desktop, laptop or palm top personal computer (PC), personal digital assistant (PDA) or other processor-based device capable of establishing a network connection over which music identified by the extracted music information can be downloaded or otherwise purchased by the user.

The extracted music information stored in the RAM 114 or in a memory card or other storage device is transmitted to a music server over the above-noted network connection. The server may then respond with detailed information about the corresponding music selections and instructions to the user regarding how to make the purchase. The purchased selections may be delivered to the user in a variety of forms, e.g., CD, MiniDisk, linear format audio file, MP3 file, etc., and may be directly downloaded over the network connection, or directly shipped to a supplied user address.

Figure 2:
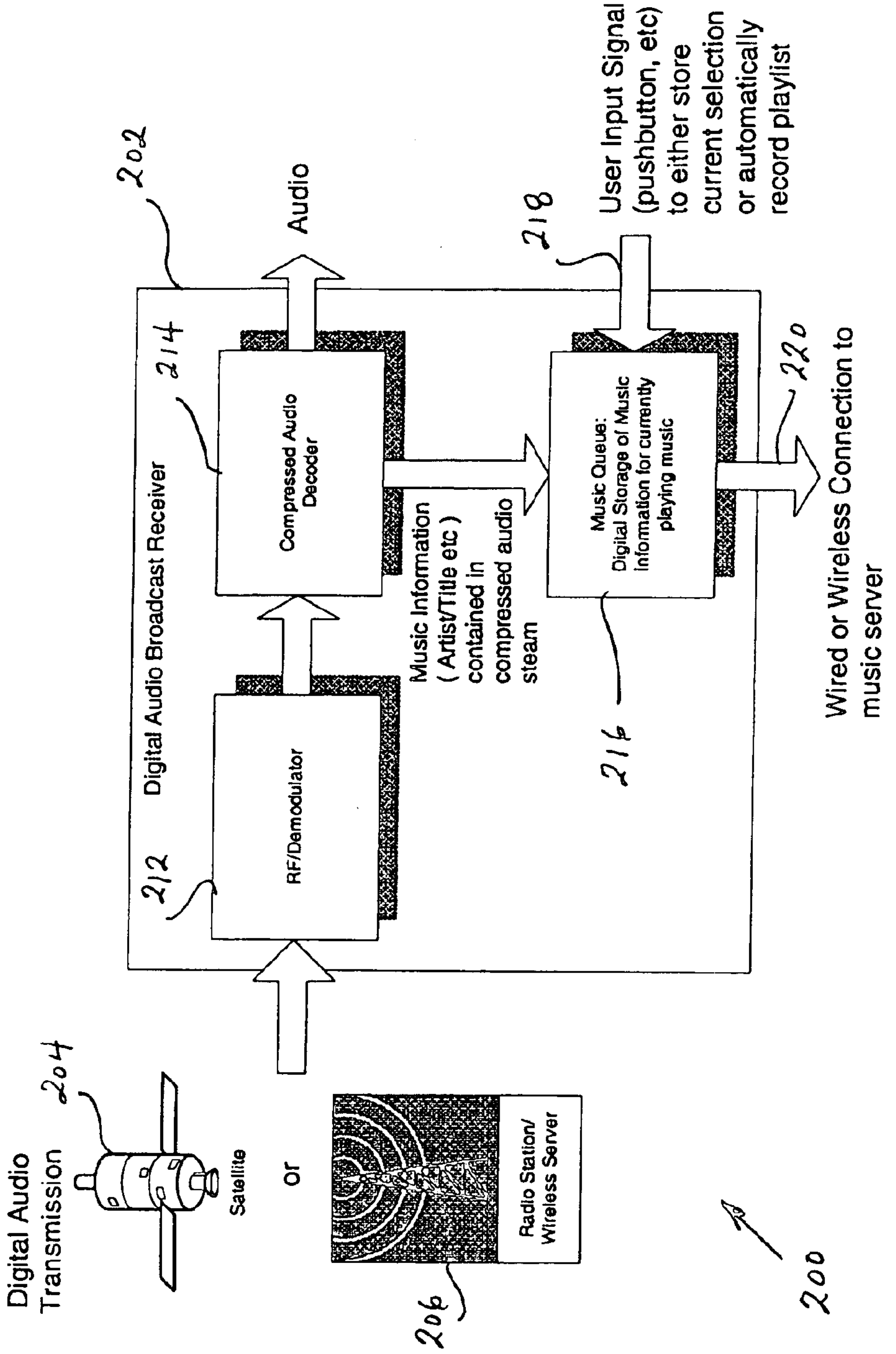
FIG. 2 is a block diagram of an exemplary DAB receiver with music information storage capability in accordance with a second illustrative embodiment of the invention.

FIG. 2 shows a block diagram illustrating the operation of a DAB system 200 configured in accordance with another illustrative embodiment of the invention. The system 200 includes a DAB transmitter 204 or 206 for generating a DAB signal for transmission to a DAB receiver 202. The transmitter 204 represents a satellite-based transmitter, while the transmitter 206 represents a terrestrial transmitter, e.g., a radio station or wireless service transmitter. It should be noted that these transmitters are shown as examples only, and that the invention can be used with many other types of transmitters.

The receiver 202 may be viewed as a functional diagram of a receiver configured in the same or a similar manner as the receiver 102 previously described in conjunction with FIG. 1, or may be viewed as an alternative implementation of the receiver 102. The receiver 202 includes an RF/demodulator block 212 which processes a received DAB signal and delivers a compressed digital audio bit stream to a compressed audio decoder 214. The decoder 214, which may be, e.g., a PAC decoder, generates an audio output signal, i.e., by decoding the compressed digital audio bitstream and reconstructing therefrom the audio output signal.

The decoder 214 extracts music information, e.g., artist, title, etc., from the compressed digital audio bit stream, and delivers the extracted music information to a music queue 216 which provides digital storage of music information for currently-playing music. A user input signal 218, e.g., a push button command or other suitable input, is applied to the receiver 202 to direct the storage of the music information for a current selection, or to place the receiver 202 in the above-noted mode in which music information for all possible broadcast music selections is automatically extracted and stored as long as the system remains in that mode. At some later point in time, a wired or wireless connection 220 to a music server is established, such that the extracted information stored in the music queue 216 is transmitted over the connection to the music server and used to determine appropriate purchase instructions and other information to be delivered to the user. As previously noted, the extracted music information may be stored in a RAM or other storage device built into the receiver, or in a removable memory card, or in any other type of memory capable of storing extracted information.

Figure 3:
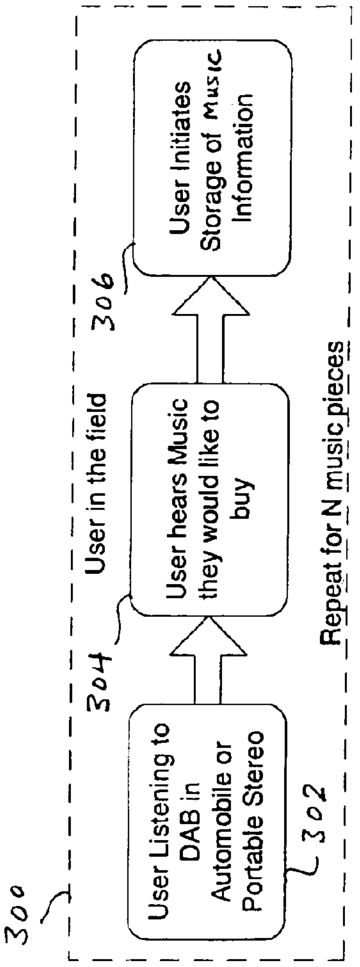
FIGS. 3 and 4 are flow diagrams illustrating extracted music information storage and purchasing operations, respectively, in accordance with the invention, performed using the DAB receivers of FIGS. 1 and 2.
Figure 4:
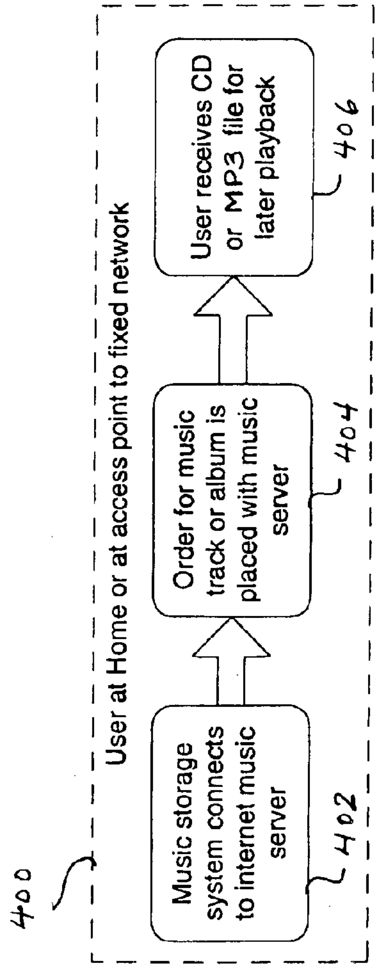
Figure 1:
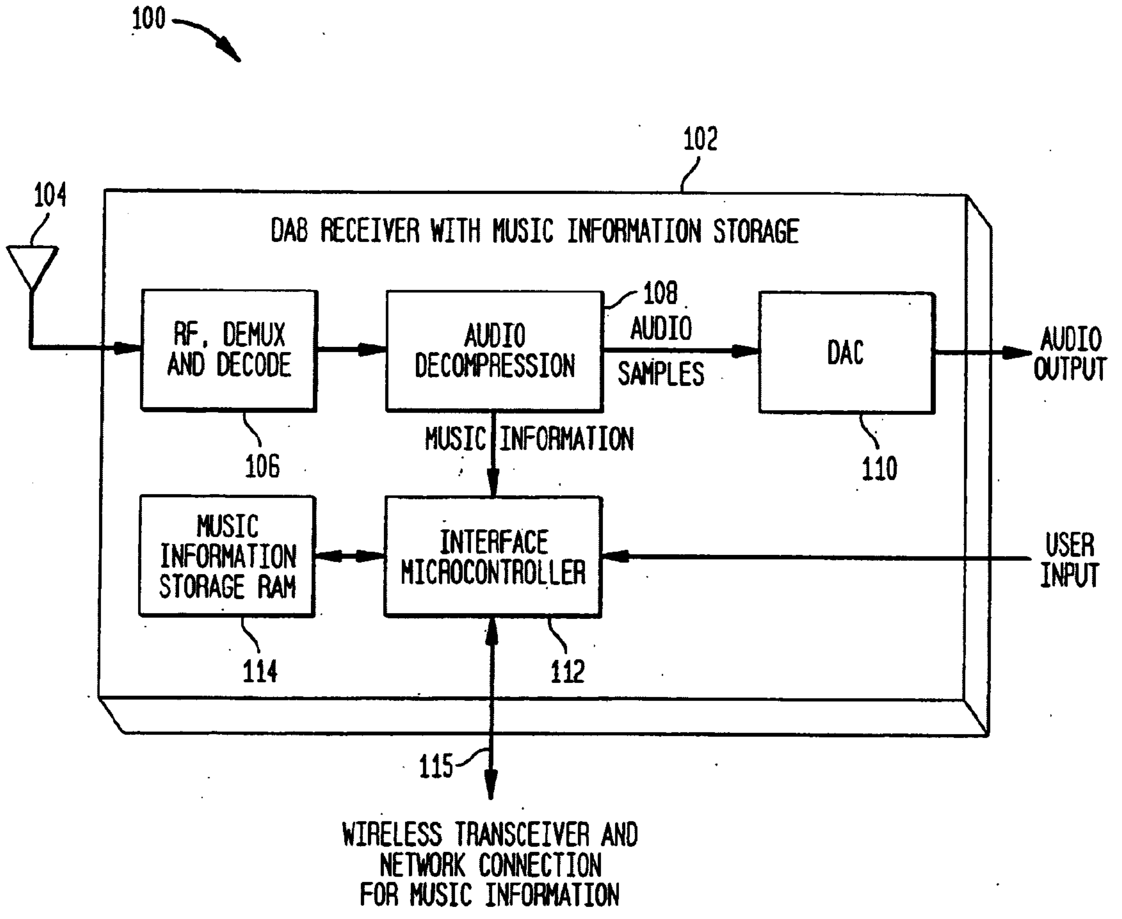
Figure 2:
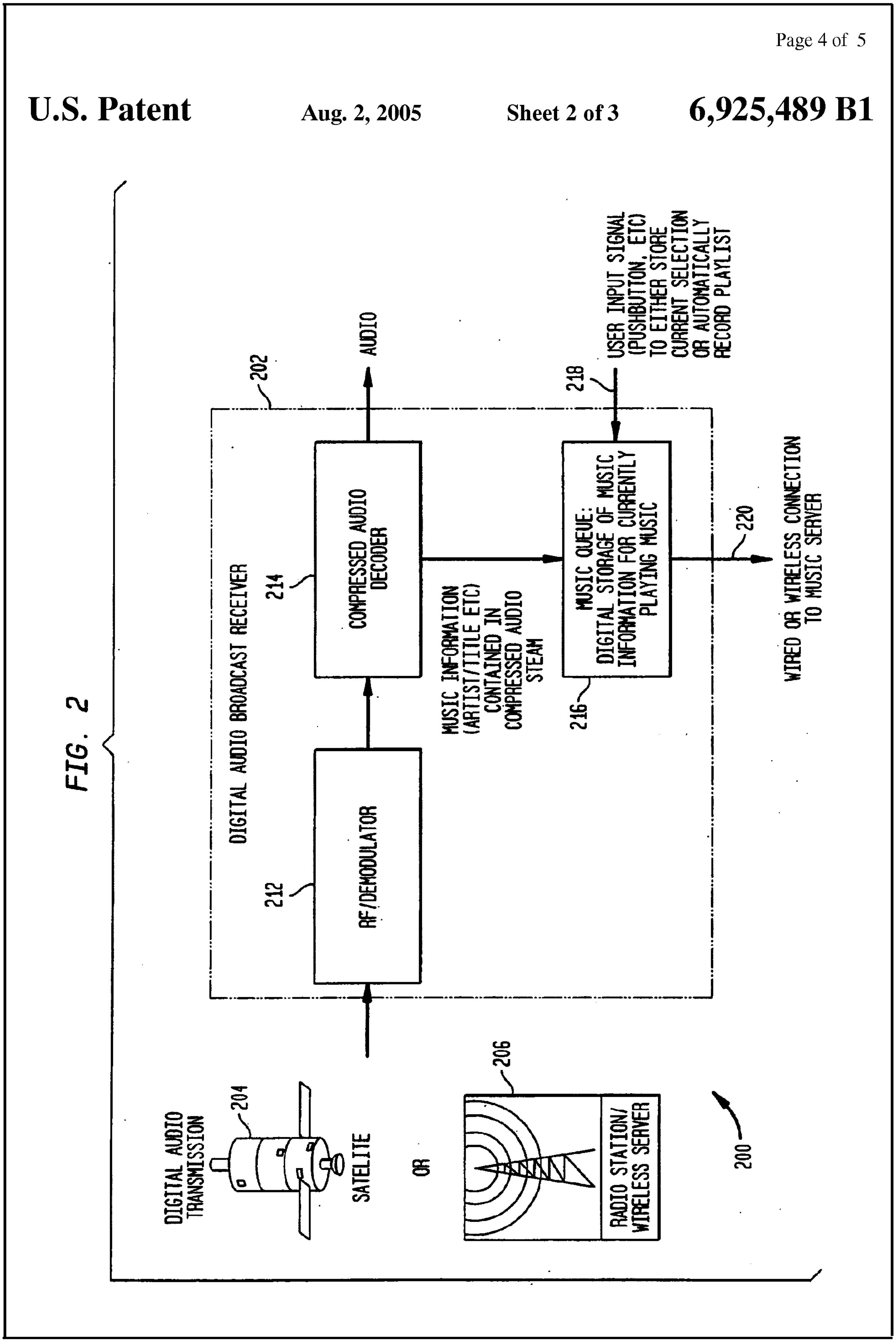
Figure 3:
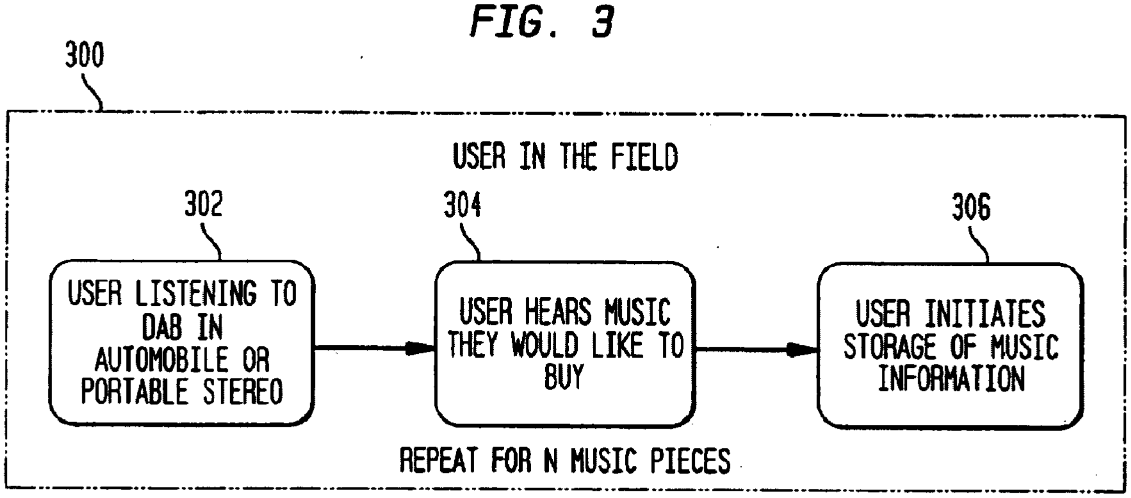
Figure 4:
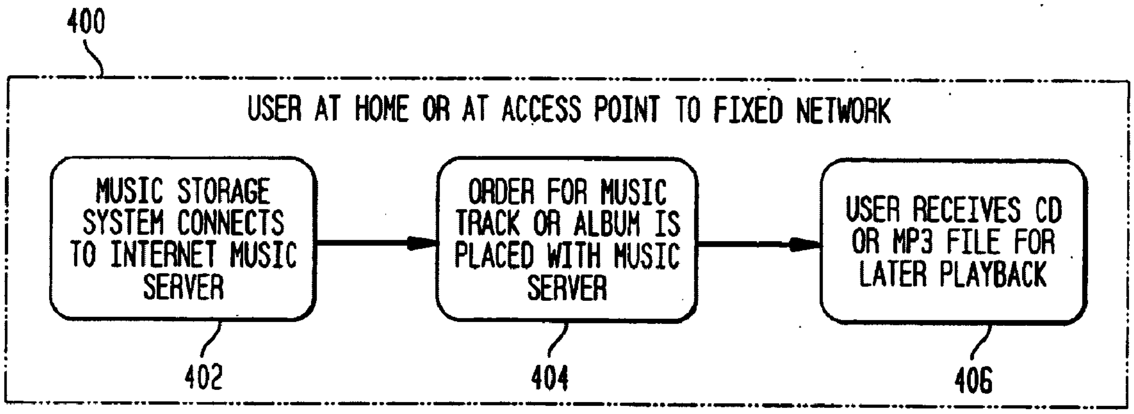

FIGS. 3 and 4 are flow diagrams showing examples of an extracted music information storing operation 300 and a purchasing operation 400, respectively. These operations may be implemented in the receivers 102, 202 described above. Referring to FIG. 3, the operation 300 is performed by a user in the field, i.e., away from an access point to a fixed wired or wireless network. In step 302, the user listens to a DAB receiver implemented in an automobile, portable stereo or other device. In step 304, the user hears music being broadcast that is of interest for potential purchase. The user in step 306 then initiates extraction and storage of corresponding music information in the manner previously described. The operation 300 may be repeated for any desired number N of pieces of music, as long as the total amount of extracted music information to be stored remains within the limits of the corresponding storage device.

The purchase operation 400 of FIG. 4 is performed by the user when the user is at home or at another access point to a fixed wired or wireless network. In step 402, a music information storage system or device, e.g., the RAM 114 of receiver 102, the music queue 216 of receiver 202, a PCMCIA card or other type or memory card, etc., is connected to an Internet music server via a network connection. The music server uses the extracted music information to determine what the user might like to purchase, and presents this information, as well as appropriate ordering instructions, to the user via the network connection. In step 404 the user places an order for the corresponding music track, album, CD, etc. with the music server. The music server then processes the order, and the user in step 406 receives the ordered product, e.g., receives a CD or MP3 file via download for later playback. As previously noted, the ordered product may also be delivered to the user through other conventional means, e.g., parcel post, direct delivery, etc.

Advantageously, the present invention allows a user to quickly and effectively store information identifying selected currently-played music in a broadcast system, while also ensuring that artists, distributors, record companies, etc. are appropriately compensated for content duplication.

It should be noted that the above-described embodiments of the invention are illustrative only. For example, the invention can be implemented in the form of other systems capable of automatically storing information regarding a broadcast upon user command, such that the information can be subsequently transmitted to a server or other source for use in conjunction with the purchase of a corresponding product or service. In addition, the invention can be used with other types of information, e.g., video or image information, data, etc., and with other types of communication systems, such as satellite based systems, Internet-based broadcasting systems, cable networks, etc. Furthermore, a variety of different electronic commerce techniques and configurations may be used to allow users to purchase music or other information previously transmitted via radio broadcast channel or other communication medium. These and numerous other alternative embodiments and implementations within the scope of the following claims will be apparent to those skilled in the art.

What is claimed is:

1. A method of providing information to a user, the method comprising the steps of:

storing identification information extracted from a current wireless broadcast which is being presented in a perceptible form to a user, in response to a command from the user, the command being entered at a wireless receiver, the identification information being extracted and stored without requiring any connection between the wireless receiver and an access point of a data network, wherein the identification information specifies sufficient information to identify at least one deliverable information item associated with the broadcast; and subsequently delivering at least a portion of the extracted identification information over the data network to a server which processes the identification information to identify the at least one deliverable information item associated with the broadcast.

2. The method of claim 1 wherein the current broadcast comprises a particular piece of music.

3. The method of claim 2 wherein the deliverable information item associated with the broadcast comprises a compilation which includes the piece of music.

4. The method of claim 2 wherein the deliverable information item comprises a disk-based storage medium having the piece of music stored thereon.

5. The method of claim 2 wherein the deliverable information item comprises a downloadable file containing the piece of music.

6. The method of claim 2 wherein the identification information comprises at least one of an artist, a title, an album name, a label identifier, a source identifier, a date, and a time associated with the current broadcast of the piece of music.

7. The method of claim 1 wherein the identification information is extracted from a compressed digital audio bitstream associated with the current broadcast.

8. The method of claim 1 wherein identification information is automatically extracted and stored for a plurality of distinct broadcasts upon entry of a corresponding user command.

9. The method of claim 1 wherein the extracted identification information is stored in a memory of the wireless receiver which receives the current wireless broadcast.

10. The method of claim 1 wherein the extracted identification information is stored in a removable memory device associated with the wireless receiver which receives the wireless broadcast, and wherein the removable memory device is removable from the receiver and insertable into another device which establishes a network connection for delivery of the identification information to the server over the data network.

11. The method of claim 1 wherein the extracted identification information is delivered to the server over a network connection established over the Internet.

12. An apparatus for use in providing information to a user, the apparatus comprising:

a storage device connectable to a wireless receiver, for storing identification information extracted from a current wireless broadcast which is being presented in a perceptible form to a user, in response to a command from the user, the command being entered at the wireless receiver, the identification information being extracted and stored without requiring any connection between the wireless receiver and an access point of a data network, wherein the identification information specifies sufficient information to identify at least one deliverable information item associated with the broadcast, such that at least a portion of the identification information is subsequently deliverable over the data network to a server which processes the identification information to identify the at least one deliverable information item associated with the broadcast.

13. The apparatus of claim 12 wherein the current broadcast comprises a particular piece of music.

14. The apparatus of claim 13 wherein the deliverable information item associated with the broadcast comprises a compilation which includes the piece of music.

15. The apparatus of claim 13 wherein the deliverable information item comprises a disk-based storage medium having the piece of music stored thereon.

16. The apparatus of claim 13 wherein the deliverable information item comprises a downloadable file containing the piece of music.

17. The apparatus of claim 13 wherein the identification information comprises at least one of an artist, a title, an album name, a label identifier, a source identifier, a date, and a time associated with the current broadcast of the piece of music.

18. The apparatus of claim 12 wherein the identification information is extracted from a compressed digital audio bitstream associated with the current broadcast.

19. The apparatus of claim 12 wherein the identification information is automatically extracted and stored for a plurality of distinct broadcasts upon entry of a corresponding user command.

20. The apparatus of claim 12 wherein the storage device comprises a memory of the wireless receiver which receives the current wireless broadcast.

21. The apparatus of claim 12 wherein the storage device comprises a removable memory device associated with the wireless receiver which receives the wireless broadcast, and wherein the removable memory device is removable from the receiver and insertable into another device which establishes a network connection for delivery of the identification information to the server over the data network.

22. The apparatus of claim 12 wherein the extracted identification information is delivered to the server over a network connection established over the Internet.

23. An apparatus for use in providing information to a user, the apparatus comprising:

a wireless receiver having associated therewith a storage device for storing identification information extracted from a current wireless broadcast which is being presented in a perceptible form to a user, in response to a command from the user, the command being entered at the wireless receiver, the identification information being extracted and stored without requiring any connection between the wireless receiver and an access point of a data network, wherein the identification information specifies sufficient information to identify at least one deliverable information item associated with the broadcast, such that at least a portion of the identification information is subsequently deliverable over the data network to a server which processes the identification information to identify the at least one deliverable information item associated with the broadcast.

* * * * *

UNITED STATES PATENT AND TRADEMARK OFFICE

CERTIFICATE OF CORRECTION

PATENT NO. : 6,925,489 B1 
DATED : August, 2, 2005
INVENTOR(S) : Steven DeArmond Curtin It is certified that error appears in the above-identified patent and that said Letters Patent is hereby corrected as shown below:

Delete Title page illustrating figure, and substitute therefor new Title page illustrating figure (attached).

Delete drawing sheets 1-3, and substitute therefor drawing sheets 1-3, with the attached sheets.

Signed and Sealed this

Twenty-seventh Day of September, 2005

JON W. DUDAS
*Director of the United States Patent and Trademark Office*

(12) United States Patent
Curtin

(10) Patent No.: US 6,925,489 B1
(45) Date of Patent: Aug. 2, 2005

(54) METHODS AND APPARATUS FOR IDENTIFICATION AND PURCHASE OF BROADCAST DIGITAL MUSIC AND OTHER TYPES OF INFORMATION

(75) Inventor: Steven DeArmond Curtin, Freehold, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/444,818

(22) Filed: Nov. 22, 1999

(51) Int. Cl.[7] .................... G06F 15/16

(52) U.S. Cl. .................... 709/217; 709/217; 709/219; 711/1; 375/219; 395/200; 455/66; 84/609; 380/25

(58) Field of Search .................... 709/219, 217; 395/200; 455/66; 84/609; 380/25

(56) References Cited

U.S. PATENT DOCUMENTS

| | | | | |
|---|---|---|---|---|
| 4,843,562 A | | 6/1989 | Kenyon et al. | |
| 5,577,266 A | * | 11/1996 | Takahisa et al. | 455/66 |
| 5,616,876 A | * | 4/1997 | Cluts | 84/609 |
| 5,809,246 A | * | 9/1998 | Goldman | 395/200 |
| 5,812,937 A | * | 9/1998 | Takahisa et al. | 455/66 |
| 5,835,595 A | * | 11/1998 | Fraser et al. | 380/25 |
| 6,295,555 B1 | * | 9/2001 | Goldman | 709/219 |
| 6,317,784 B1 | * | 11/2001 | Mackintosh et al. | 709/219 |

FOREIGN PATENT DOCUMENTS

| | | |
|---|---|---|
| DE | 43 13 107 C1 | 4/1993 |
| EP | 0 713 335 A2 | 5/1996 |
| EP | 00 31 0070 | 11/2004 |
| WO | WO 99/35771 | 7/1999 |

OTHER PUBLICATIONS

P. Kafka, "Play it Again," http://www.forbes.com, Jul. 1999.

J.R. Garber, "Albums and Alpo," http://www.forbes.com, Jul. 1999.

D. Sinha, J.D. Johnston, S. Dorward and S.R. Quackenbush, "The Perceptual Audio Coder," in Digital Audio, Section 42, pp. 42-1 to 42-18, CRC Press, 1998.

B.W. Kroeger and A.J. Vigil, "Improved IBOC DAB Technology for AM and FM Broadcasting," SBE Engineering Conference, pp. 1-10, 1996.

B.W. Kroeger and D. Cammarata, "Robust Modem and Coding Techniques for FM Hybrid IBOC DAB," IEEE Transactions on Broadcasting, vol. 43, No. 4, pp. 412-420, Dec. 1997.

B.W. Kroeger and P.J. Peyla, "Compatibility of FM Hybrid In-Band On-Channel (IBOC) System for Digital Audio Broadcast," IEEE Transactions on Broadcasting, vol. 43, No. 4, pp. 421-430, Dec. 1997.

* cited by examiner

*Primary Examiner*—William A. Cuchlinski, Jr.
*Assistant Examiner*—Adnan Mirza

(57) ABSTRACT

Identification information is extracted from a current broadcast of a piece or music or other type of information of interest to a user, and stored in a memory or other storage device, in response to a user command. The identification information includes sufficient information to identify at least one deliverable information item associated with the current broadcast, e.g., a CD or MP3 file which contains the particular piece of music. When the user later has access to a wired or wireless network connection, the extracted identification information is delivered over a network connection to a server which processes the delivered information to identify the deliverable information item associated with the broadcast. The user can then purchase the deliverable information item by appropriate interaction with the server. The extracted identification information may be stored in a removable memory device associated with a receiver which receives the broadcast. In this case, the removable memory device is subsequently removed from the receiver and inserted into another device which establishes the network connection for delivery of the identification information to the server.

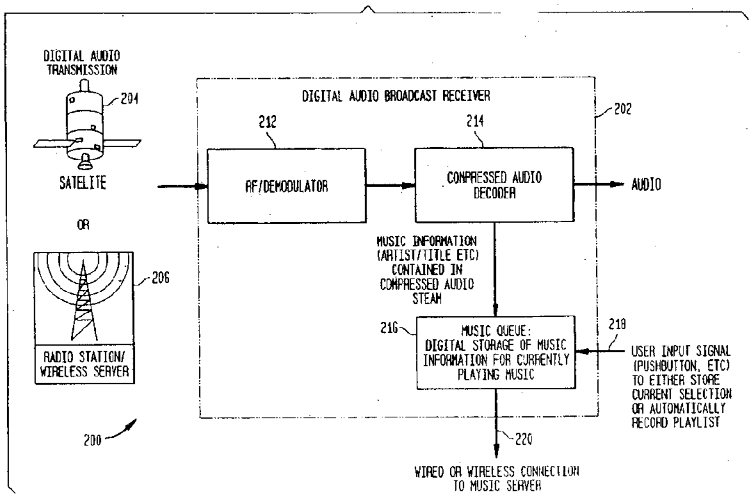

23 Claims, 3 Drawing Sheets